US008738793B2

(12) United States Patent
Gutha et al.

(10) Patent No.: US 8,738,793 B2
(45) Date of Patent: May 27, 2014

(54) PRIORITY SELECTION MECHANISM FOR DRIVING OUTPUTS FROM CONTROL LOGIC FOR CONTROLLERS OF VARIOUS PROTOCOLS (75) Inventors: Stalin Gutha, Bangalore (IN); Janaki Krishnaswamy, Bangalore (IN); Lavanya Bhadriraju, Bangalore (IN); Ankur Jhawar, Bangalore (IN); Kevin B. Moore, Chaska, MN (US); Subramanya Nagaraj, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1002 days.

(21) Appl. No.: 12/650,476

(22) Filed: Dec. 30, 2009

(65) Prior Publication Data
US 2011/0160880 A1 Jun. 30, 2011

(51) Int. Cl.
G06F 15/16 (2006.01)
G06F 9/45 (2006.01)

(52) U.S. Cl.
USPC .......................................... 709/230; 717/140

(58) Field of Classification Search
None
See application file for complete search history.

(56) References Cited

U.S. PATENT DOCUMENTS

| 2005/0230490 | A1 | 10/2005 | Pouchak et al. |
| 2007/0110360 | A1* | 5/2007 | Stanford ......................... 385/14 |
| 2008/0004754 | A1 | 1/2008 | Pouchak et al. |
| 2008/0010049 | A1 | 1/2008 | Pouchak et al. |
| 2008/0015739 | A1 | 1/2008 | Wacker |
| 2008/0016493 | A1 | 1/2008 | Pouchak et al. |
| 2008/0115153 | A1 | 5/2008 | Brindle |
| 2008/0125914 | A1 | 5/2008 | Wacker |
| 2009/0113037 | A1 | 4/2009 | Pouchak |
| 2010/0100583 | A1 | 4/2010 | Pouchak |

OTHER PUBLICATIONS

Configuring an HVAC System using National Instruments Products, Jun. 15, 2009, National Instruments.*
Honeywell Spyder Bacnet User's Guide, 242 pages, Revised Jul. 2009.
Honeywell Spyder User's Guide 202 pages, Released Jul. 2007.
Siemens, BACnet for DESIGO 27 Pages, prior to Dec. 30, 2009.

* cited by examiner

Primary Examiner — Hyun Nam
(74) Attorney, Agent, or Firm — Seager Tufte & Wickhem LLC (57) ABSTRACT A priority selection mechanism for driving outputs from control logic which can be automatically translated to controllers of various protocols. The priority selection mechanism may assign a priority to the outputs and select the output having the highest priority as the output of the control logic. There may be an abstract representation of the priority logic which may permit a protocol mechanism to be used in the logic without the designer or user needing to know the details of the mechanism.

9 Claims, 8 Drawing Sheets

| | Range | | Input Value | Description |
|---|---|---|---|---|
| Input Name | Low | High | | |
| priority1 Value through priority16 | >=-infinity | <+infinity | Unconnected or invalid | Output = value of the highest priority input (priority1 is top priority and priority16 is lowest priority). If no inputs are valid, then the output is also invalid. |

47
1) Priority 1 = Unconnected
2) Priority 2 = Invalid
3) Priority 3 = 50
4) Priority 4 = 60
5) Priority 5 = -20
6) Priority 6 = 80
7) Priority 7 = 30
8) Priority 8 = Unconnected
9) Priority 9 = Unconnected
10) Priority 10 = Unconnected
11) Priority 11 = Unconnected
12) Priority 12 = Unconnected
13) Priority 13 = Unconnected
14) Priority 14 = Invalid
15) Priority 15 = 40
16) Priority 16 = 10

| S.No. | Description | LON | BACnet |
|---|---|---|---|
| 1 | The input to the priority slot of the Priority Override function block can be a physical point, a software point, or function blocks but cannot be a constant. | Applicable | Applicable |
| 2 | The PriorityOut slot can be connected to only one physical point which can be modulating output or binary output. | Applicable | Applicable |
| 3 | The memory increment depends on the type of input block. | Applicable | Applicable |
| 4 | The FB count in the Resource Usage View is only incremented when the Priority Override block contains a Valid Link and a Valid Knob. | Applicable | Not Applicable |
| 5 | If there are valid links from priority levels 1 to 8, FB count is incremented by 1. | Applicable | Not Applicable |
| 6 | If there are valid links from priority levels 9 to 15, FB count is incremented by 2. | Applicable | Not Applicable |
| 7 | If there are valid links greater than priority level 15, FB count is incremented by 3. | Applicable | Not Applicable |
| 8 | The FB count in the Resource Usage View is not incremented. | Not Applicable | Applicable |

Figure 8

PRIORITY SELECTION MECHANISM FOR DRIVING OUTPUTS FROM CONTROL LOGIC FOR CONTROLLERS OF VARIOUS PROTOCOLS

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,447, filed Dec. 30, 2009, entitled "A Mechanism for Constructing Generic Control Logic including Versions in Various Protocols"; application Ser. No. 12/650,467, filed Dec. 30, 2009, entitled "Protocol Independent Programming Environment"; application Ser. No. 12/650,485, filed Dec. 30, 2009, entitled "An Approach to Automatically Encode Application Enumeration Values to Enable Reuse of Applications across Various Controllers"; application Ser. No. 12/650,497, filed Dec. 30, 2009, entitled "An Approach for Switching between Point Types without Affecting Control Logic"; and application Ser. No. 12/650,513, filed Dec. 30, 2009, entitled "Changeable BACnet Interface".

Application Ser. No. 12/650,385, filed Dec. 30, 2009, entitled "A Graphical Approach to Setup Data Sharing between Two Controllers", is hereby incorporated by reference. Application Ser. No. 12/650,477, filed Dec. 30, 2009, entitled "A Mechanism for Constructing Generic Control Logic including Versions in Various Protocols", is hereby incorporated by reference. Application Ser. No. 12/650,467, filed Dec. 30, 2009, entitled "Protocol Independent Programming Environment", is hereby incorporated by reference. Application Ser. No. 12/650,485, filed Dec. 30, 2009, entitled "An Approach to Automatically Encode Application Enumeration Values to Enable Reuse of Applications across Various Controllers", is hereby incorporated by reference. And application Ser. No. 12/650,497, filed Dec. 30, 2009, entitled "An Approach for Switching between Point Types without Affecting Control Logic", is hereby incorporated by reference. Application Ser. No. 12/650,513, filed Dec. 30, 2009, entitled "Changeable BACnet Interface", is hereby incorporated by reference.

U.S. patent application Ser. No. 12/256,444, filed Oct. 22, 2008, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference.

BACKGROUND

The invention pertains to programming and particularly to various programming environments. More particularly, the invention pertains to heating, ventilation and air conditioning environments.

SUMMARY

The invention is a priority selection mechanism for driving outputs from control logic that can be automatically translated for controllers having different protocols such as those of LonTalk™ and BACnet.

DESCRIPTION

An issue may be as in the following. BACnet (Bacnet) may provide a mechanism that uses a priority array for commanding output objects. The output objects may be driven at different priorities by direct digital control (DDC) programs. This mechanism appears very specific to BACnet and is not necessarily available as a protocol mechanism in LonTalk™ (Lon™, Lon, LonTalk) based controllers. The priority array mechanism may be rather complex and not readily understood which could force, for instance, a heating, ventilation and air conditioning (HVAC) application engineer to learn and understand the underlying BACnet mechanisms, in addition to doing application development tasks. LonTalk™ and Lon™ are trademarks of Echelon Corp. BACnet is a communications protocol for building automation and control networks.

The issue of implementing priority determination relative to various protocols may be resolved as indicated herein. The DDC programming environment may abstract the BACnet protocol mechanism and thus not expose the priority array directly to the user. A generic abstract function block representing the priority array may be provided to the application programmers. Such abstract block or object as used by a programmer may be automatically compiled to a relevant mechanism based on the protocol being used there. In the BACnet case, the block may translate to a BACnet priority array input. For Lon based controllers, the block may simply translate into additional logic that will run in the DDC engine using override blocks to achieve the same purpose.

Creating an abstract representation of priority-driving logic that will map to both Lon and BACnet controllers may simplify usage of a priority array and make it available even to Lon users. The abstract representation may allow a powerful protocol mechanism to be used inside the DDC logic without forcing the user to know the details of the mechanism.

There are steps that show how one may use this approach while constructing logic. A tool may expose a new function block which can be labeled "Priority Override". An application programmer may use this block just like any other function block while programming the DDC logic. When the user initiates a download to the target controller, a compilation algorithm in the tool may automatically decide how to handle the priority override function block.

For example, the compile logic for Lon Spyder™ (Spyder) controllers may automatically translate a single priority override function block into one or more Spyder override blocks and set the links between them so as to automatically accomplish the same control logic of the single priority override function block. The compile logic for BACnet controllers may automatically translate the priority override function block into a priority array used for outputs.

Figure 1:
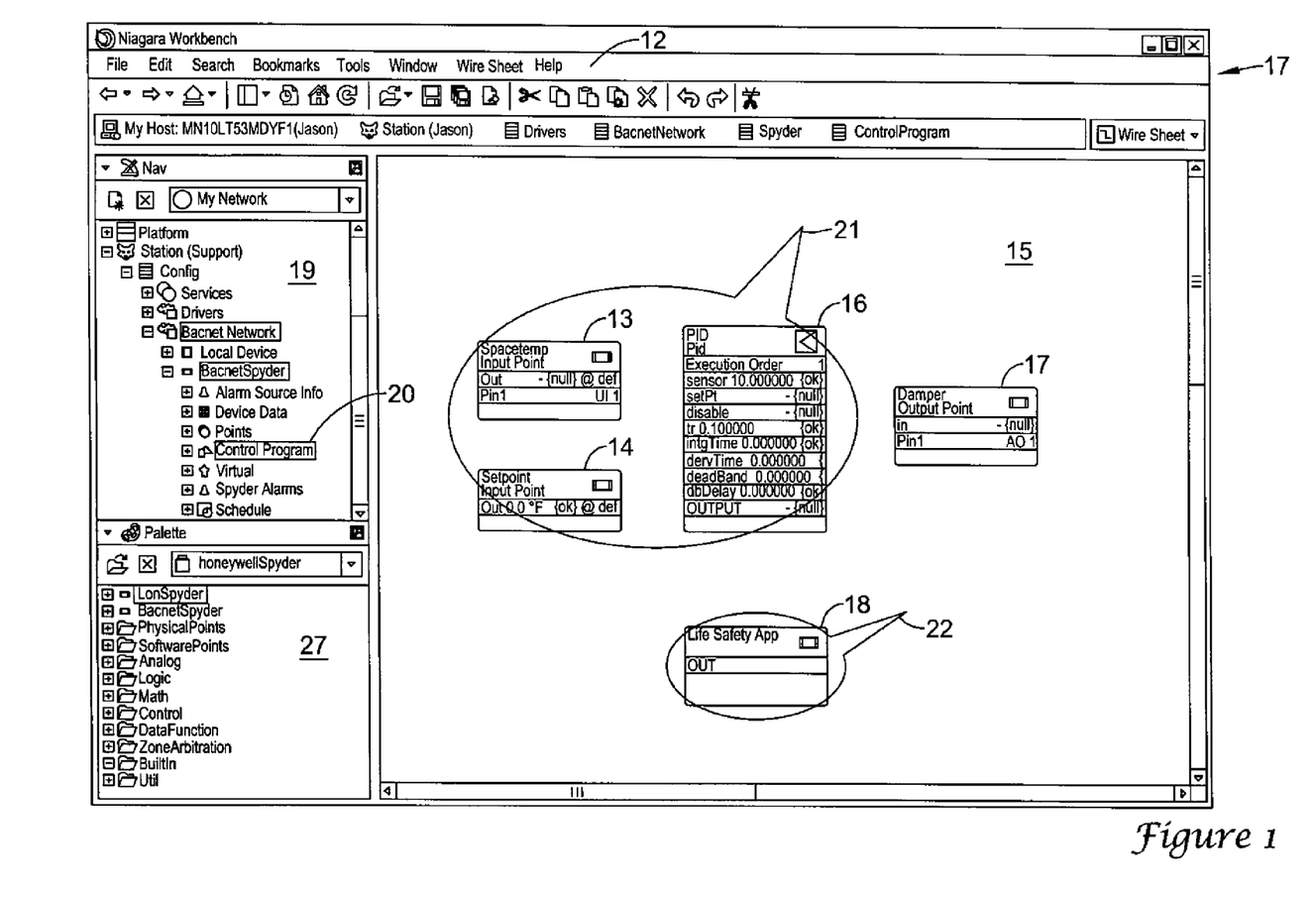
FIG. 1 is a diagram of a screen with an illustrative example of logic having a low priority loop that includes two input points and a proportional, integral and derivative control function block, high priority smoke control logic, and an output point.

FIGS. 1-4 illustrate an approach for creating generic applications using priority arrays to command outputs. A first step may include creating control logic and partitioning it based on priority and/or criticality. FIG. 1 is a screen 11 of a workbench 12. The workbench may be a Niagara™ (Niagara) workbench. In the upper left pane 19 is a Nav (navigation) palette with a "Control Program" 20 selected. Two input points for space temperature 13 and a set point 14 may be placed (i.e., drag and drop) on a workbench screen area or wiresheet 15. Other input points may be used in addition to or in lieu of input points 13 and 14. A proportional, integral and derivative control (PID) function block 16 may also be placed on screen area 15. Another function block or other function blocks may be used in addition to the PID function block 16 or in lieu of it. An output point 17 may be for a damper. The present output point may be for an additional or another item or items, or there may be another output point or points in lieu of outpoint 17 for the damper.

Input points 13 and 14 and PID function block 16 may constitute a "low priority" PID loop 21 to control a damper based on space temperature. Additionally, there may be a life safety app block 18 placed on screen area 15. Block 18 may constitute a "high priority" smoke control logic 22 which controls the damper based on smoke/fire detection.

Figure 2:
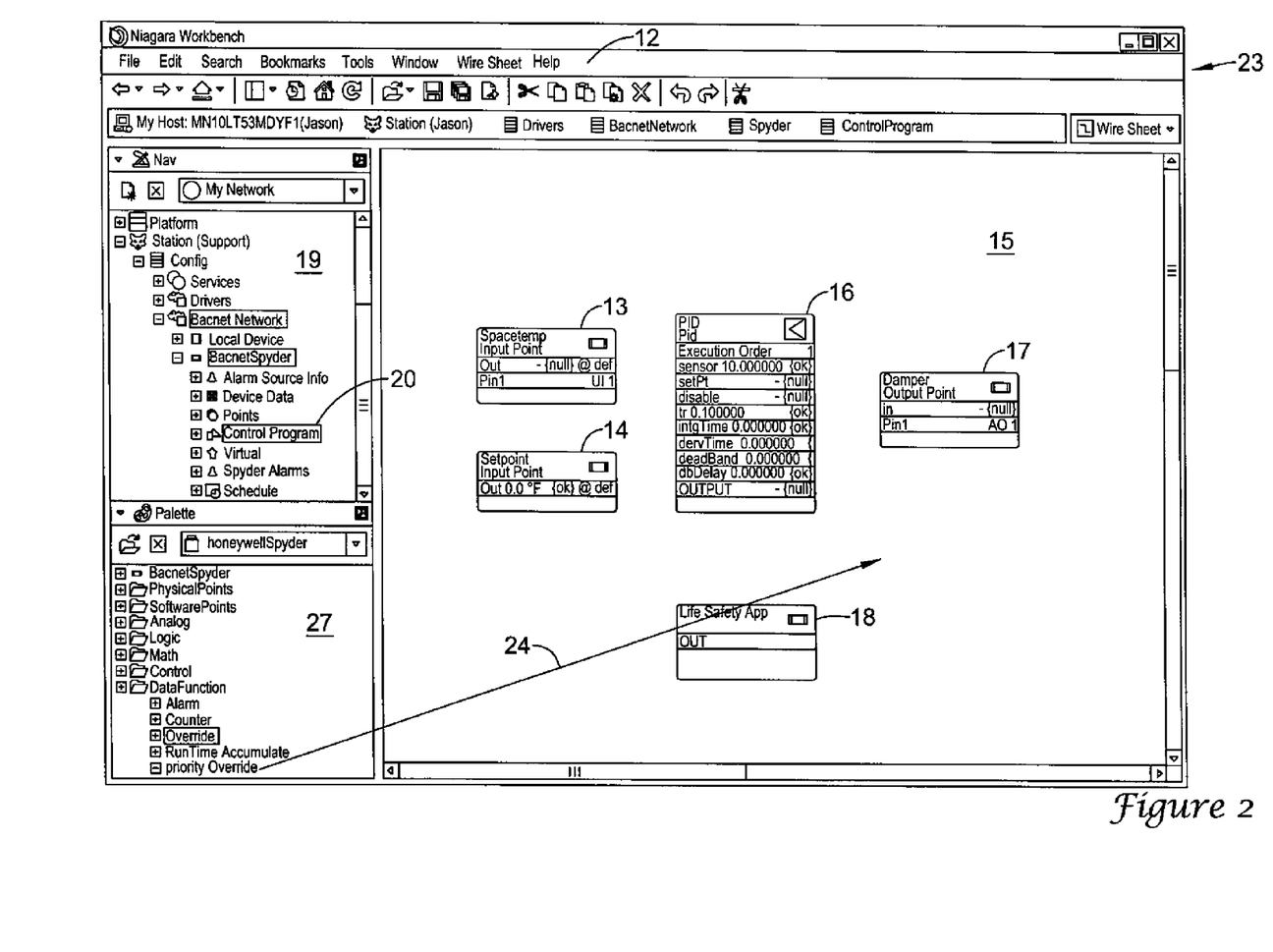
FIG. 2 is a diagram of the screen where a priority override function block is dragged into the logic screen.
Figure 3:
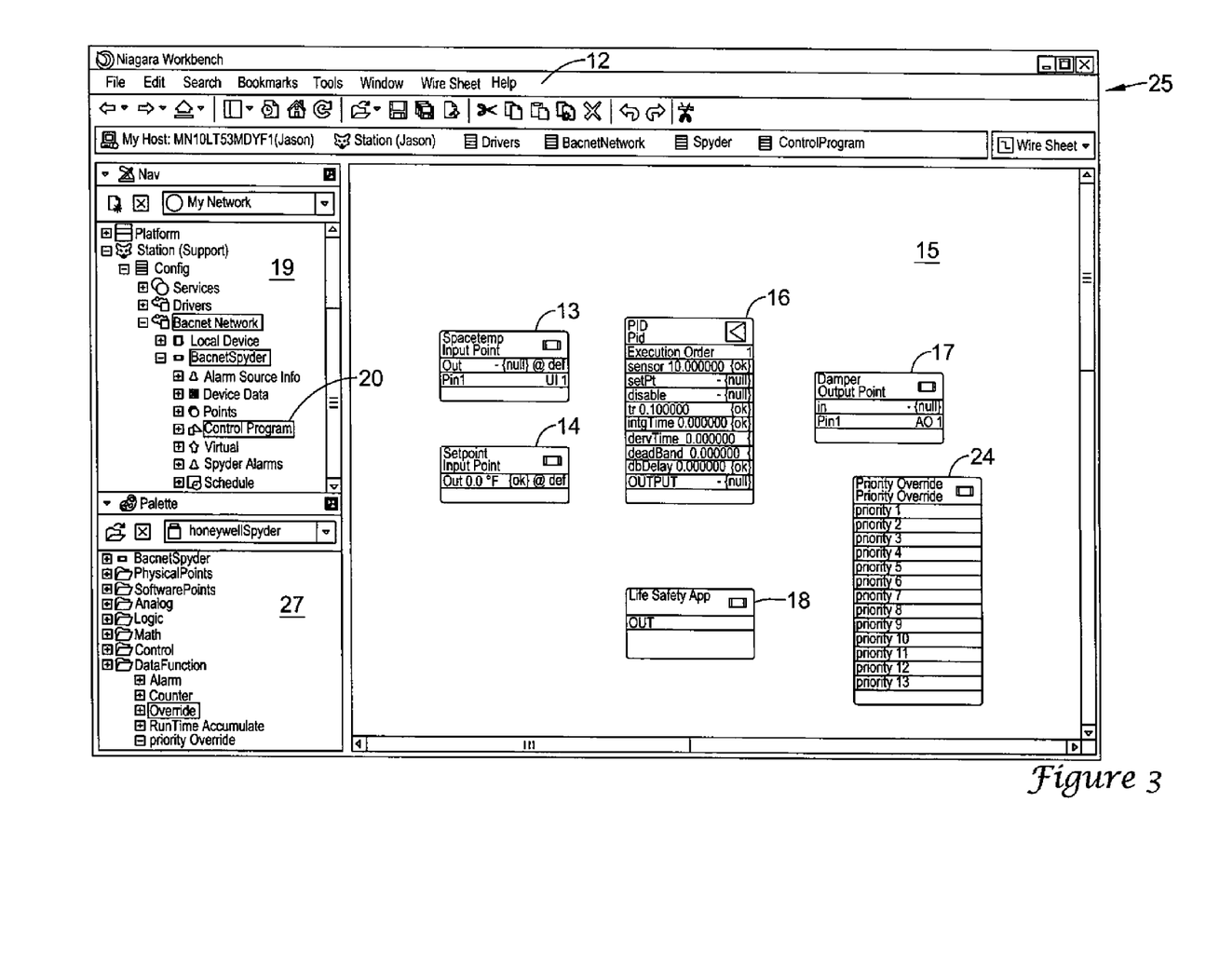
FIG. 3 is a diagram of the screen where the priority override function block is dropped into the logic.

A second step may include dragging a "priority override" function block 24 into the logic from a palette in the lower left pane 27 to screen area 15 as shown in screen 23 of FIG. 2. The priority override function block 24 may be dropped on screen area 15 as shown in screen 25 of FIG. 3. Third and fourth steps may include putting together the logic circuit which includes connecting the outputs of input points 13 and 14 to function block 16 via links 37 and 38, respectively, on screen area 15 and the output of the PID function block 16 through a priority 1 input of the priority override function block 24 via link 39, as shown in a screen 26 of FIG. 4. An appropriate connection via a link 28 from the output of the life safety app block 18 may be made to a priority 16 input of function block 24. An output of block 24 may be connected via a link 29 to an input of the damper output point 17.

Figure 4:
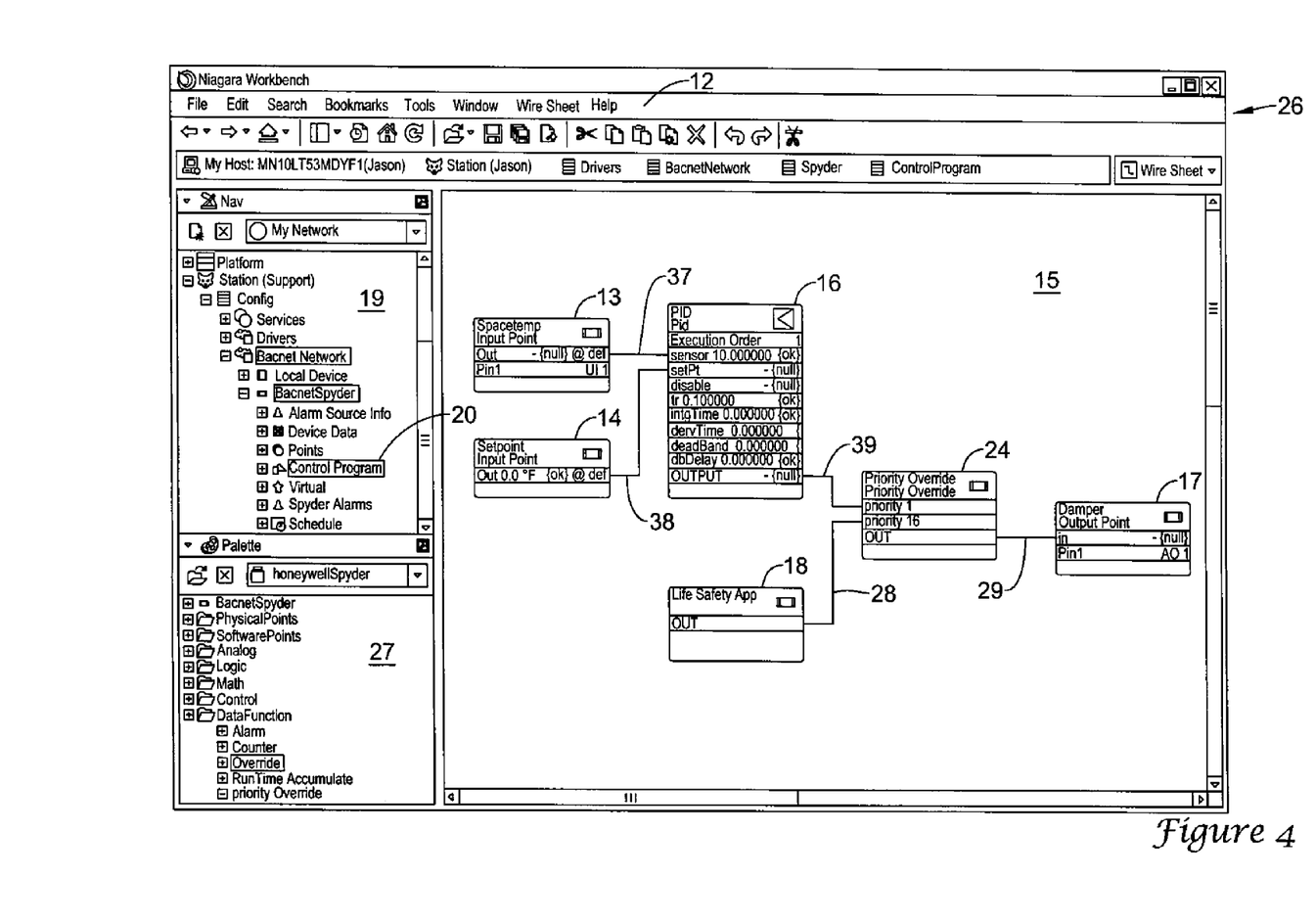
FIG. 4 is a diagram of the screen where logic components and their respective outputs are connected through the priority override function block.

The fifth step may include a download of the logic laid out in screen area 15 as shown in screen 26 of FIG. 4. Depending on the type (i.e., protocol) of target controller, the tool may automatically determine how to translate the priority override block 24. For BACnet, the priority override block 24 may be directly mapped to the analog/binary output (AO/BO) object priority arrays. For Lon, the priority override block 24 may be automatically translated to several override blocks interconnected to accomplish the same logic.

The priority override block 24 may support driving the outputs based on the priority of the connected application components. There may be different control program logic components driving the outputs at different priority levels. Block 24 may decide the priority level at which the output must be driven. This block may support up to 16 priority levels that can be connected to different application components. Priority override block 24 may be designed to support more or less than sixteen priority levels.

The priority 1 value may have the highest priority and priority 16 may have the lowest priority at block 24. The priorities may be arranged differently. Block 24 may provide a priority output called "Out". The value of the highest priority may be set as a priority output. The priority override "out" slot of the block 24 may be linked just to a modulating/binary output.

Block 24 may be used in both Lon and BACnet applications. This block may provide the priority array mechanism in case of BACnet objects. Block 24 details do not necessarily get downloaded to the controller in a case of BACnet. In a case of Lon, the priority array mechanism may be internally achieved by using override blocks. The information of the override blocks may get downloaded to the Lon controller. Thus, there should be a difference in function block count between BACnet and Lon application when block 24 is used.

During upload, the priority override block 24 may be depicted as part of the control program 20, depending on the number of application components driving the output. If there is just one application component driving the output, the control program wiresheet should show a direct link from that application component to the output since there would appear to be no priority to decide in such circumstances. If there is more than one application component driving the output, the priority override block 24 may be depicted in the logic having outputs from the components to block 24 being driven at different priority levels.

Figure 5:
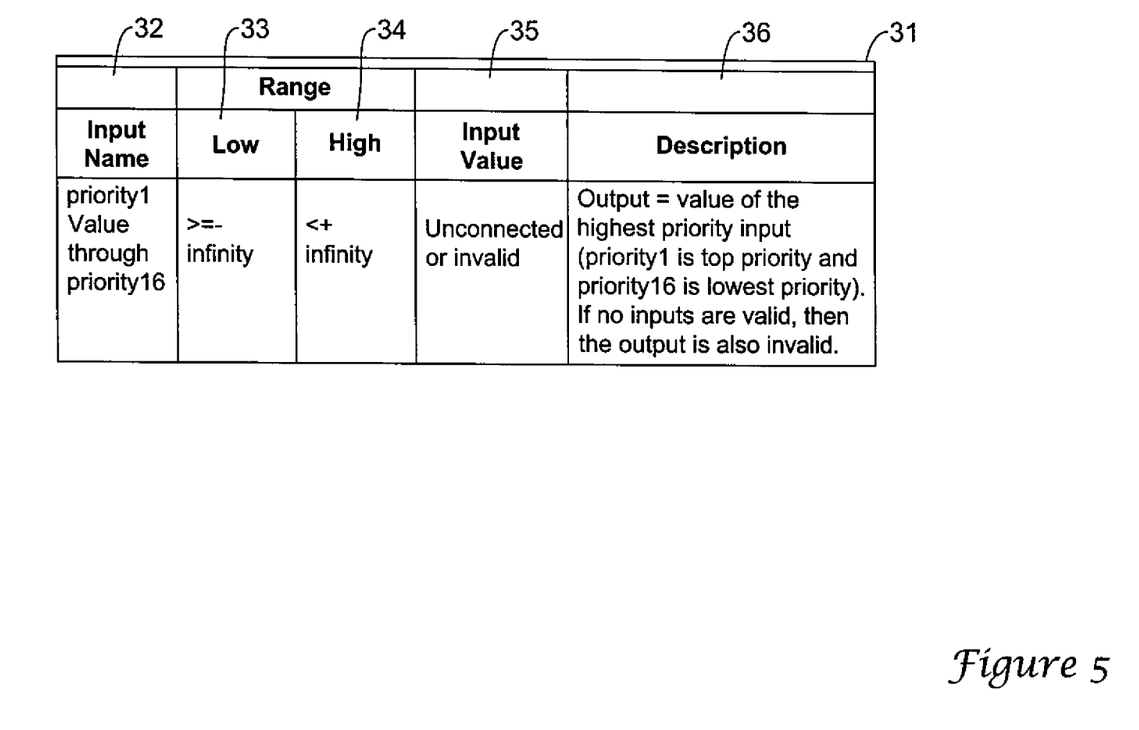
FIG. 5 shows a table indicating an analog input and its range and input value for the priority override function block.

FIG. 5 shows a table 31 for one or more analog inputs for priority override block 24. An "input name" of column 32 may reveal a priority 1 value through a priority 16 value. The range in columns 33 and 34 from "low" to "high", respectively, may be from greater or equal to minus infinity to less than positive infinity. The input value indicated in column 35 for the respective name may be indicated as unconnected or invalid. A "description" in column 36 may indicate the output as equal to a value of the highest priority input (i.e., priority 1 is the top priority and priority 16 is the lowest priority). If no inputs are valid, then the output may also be invalid.

Figure 6:
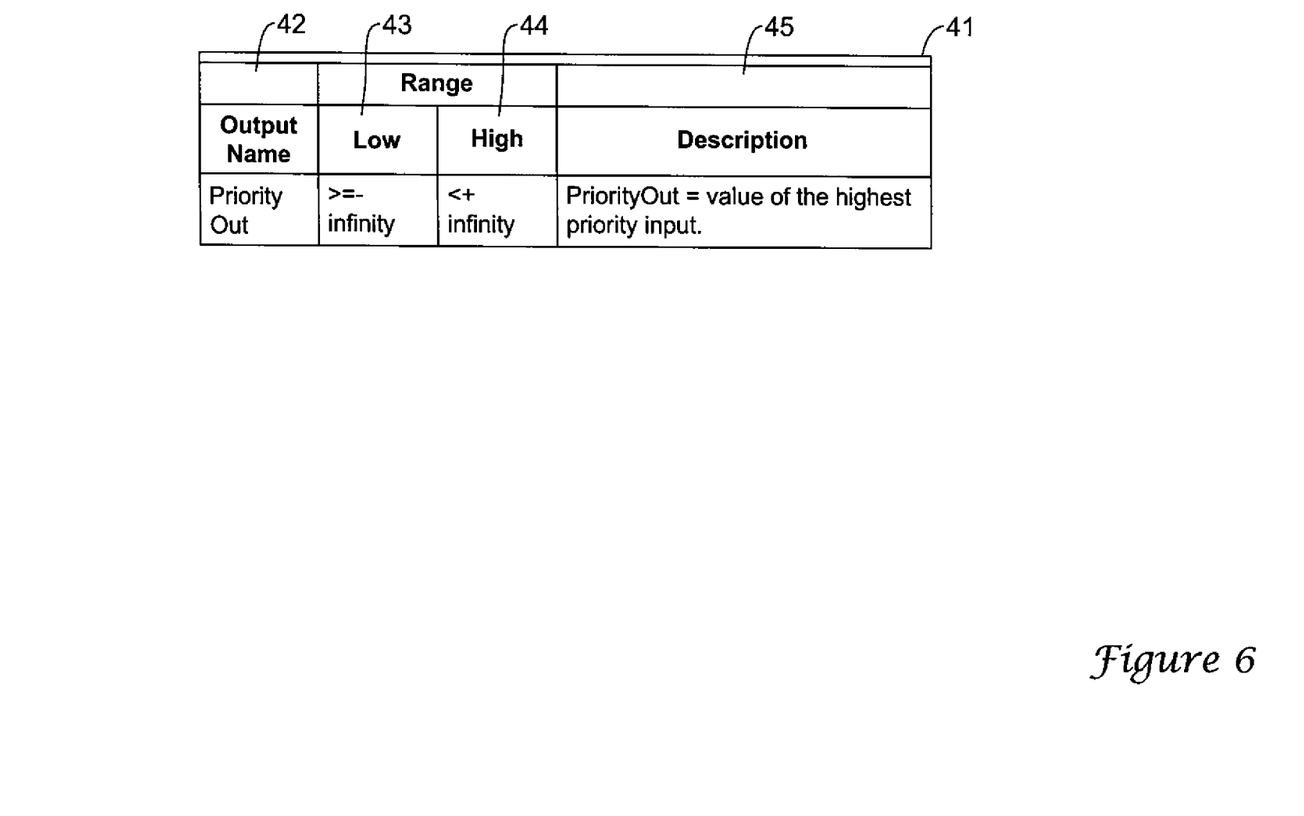
FIG. 6 shows a table indicating an output and its range for the priority override function block.

FIG. 6 shows a table 41 for the output of priority block 24. Column 42 indicates an output name which may be "Priority Out". The range in columns 43 and 44 from "low" to "high", respectively, may be from greater or equal to minus infinity to less than positive infinity. A "description" in column 45 may indicate a priority out equal to a value of the highest priority input of block 24.

Figure 7:
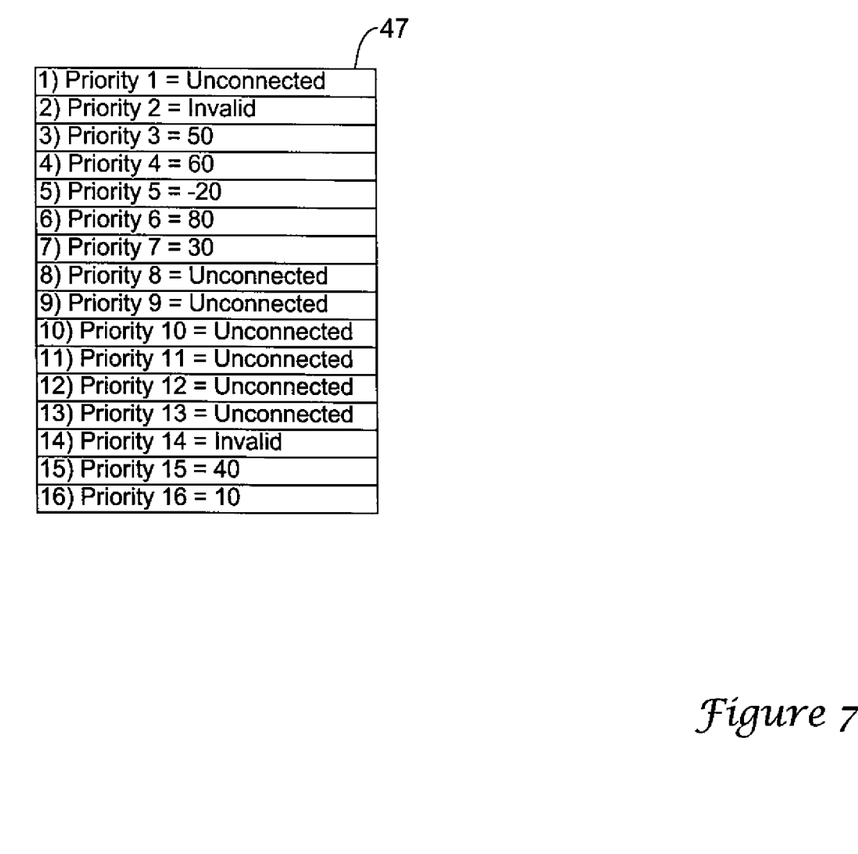
FIG. 7 shows a table of example inputs for a priority override function block with each of the inputs set to a value or status.

FIG. 7 shows a table 47 for an example priority block 24 with the inputs 1-16 set to the values and status as indicated. The values and status in another example may be otherwise than as indicated herein. Priority 1 may be unconnected. The output may be set as invalid with, for instance, priority 2 being invalid in the example of table 47. Priority 3 may be equal to 50. Priority 4 may be equal to 60. Priority 5 may be equal to −20. Priority 6 may be equal to 80. Priority 7 may be equal to 30. Priority 8 may be unconnected. Priority 9 may be unconnected. Priority 10 may be unconnected. Priority 11 may be unconnected. Priority 12 may be unconnected. Priority 13 may be unconnected. Priority 14 may be invalid. Priority 15 may be equal to 40. Priority 16 may be equal to 10. The highest priority value may be set as the output.

Figure 8:
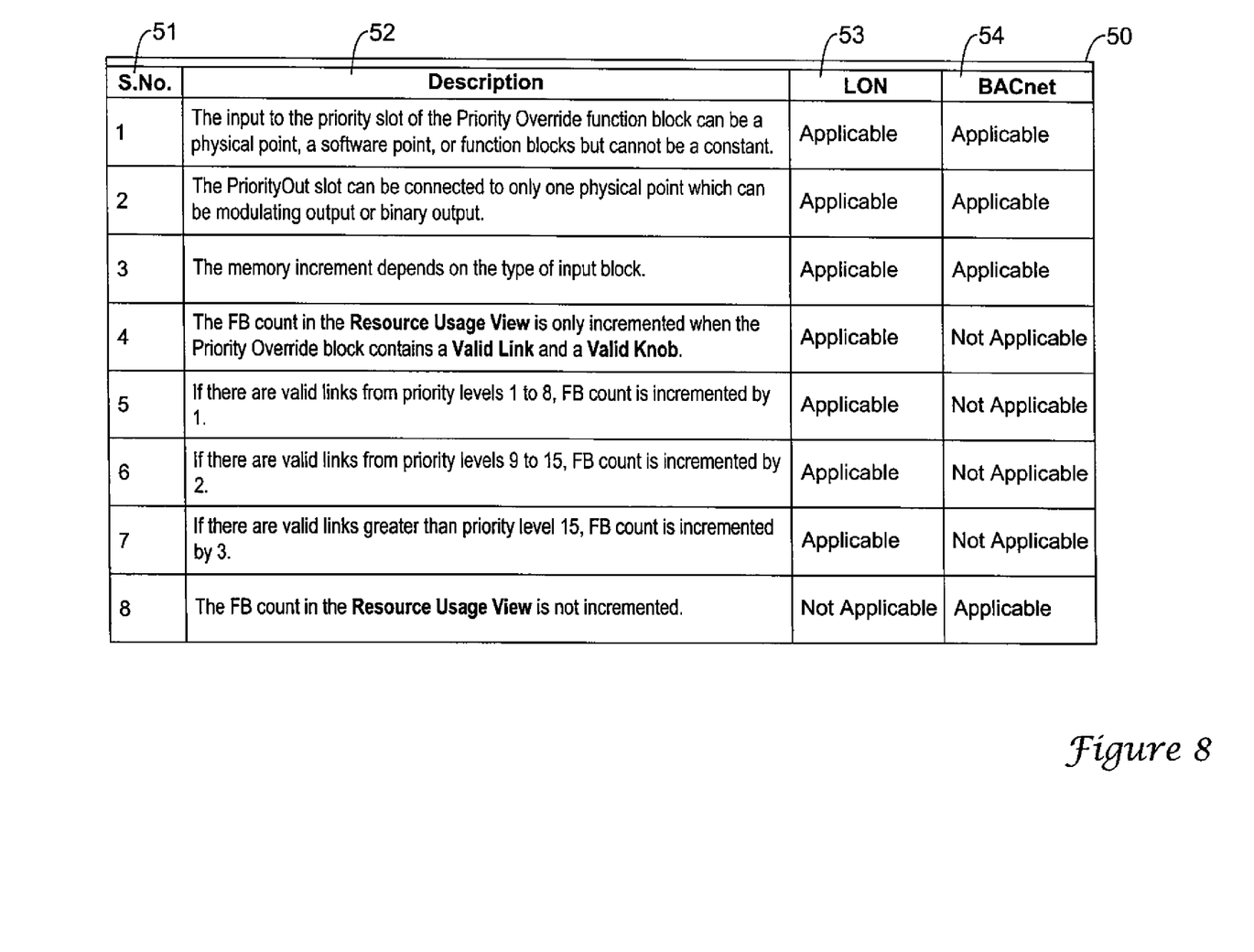
FIG. 8 shows a table indicating properties of the priority override function block for several protocols.

Properties of the priority override function block 24 are listed in a table 50 of FIG. 8. Column 51 indicates a "serial number" (S. No.) of the property indicated in a "description" column 52. Columns 53 and 54 indicate whether the property may be applicable to "Lon" and "BACnet", respectively. The first property ("S. No." 1, and so on) may indicate that the input to the priority slot of the priority override function block 24 can be a physical point, a software point, or function blocks but cannot be a constant. This property may be applicable to Lon and BACnet. The second property may indicate that the priority out slot can be connected to only one physical point which can be a modulating output or a binary output. This property may be applicable to Lon and BACnet. A third property may indicate that the memory increment depends on the type of input block. This property may be applicable to Lon and BACnet. A fourth property may indicate that the function block count in a resource usage view is only incremented when the priority override block contains a valid link and a valid knob. This property may be applicable to Lon and not necessarily applicable to BACnet. A fifth property may indicate that if there are valid links from priority levels 1 to 8, the function block count is incremented by 1. This property may be applicable to Lon and not necessarily applicable to BACnet. A sixth property may indicate that if there are valid links from priority levels 9 to 15, the function block count is incremented by 2. This property may be applicable to Lon and not necessarily applicable to BACnet. A seventh property may indicate that if there are valid links greater than priority level 15, the function block count is incremented by 3. This property may be applicable to Lon and not necessarily applicable to BACnet. An eighth property may indicate that the function block count in the resource usage view is not incremented. This property may be applicable to BACnet and not necessarily applicable to Lon.

A Spyder tool may offer a graphical environment to program the Spyder controller. One may use the wiresheet view in the engineering mode to use physical points, software points, and function blocks to build an application in the control program. The physical points, software points, and function blocks may be accessed using a palette. One may drag these items on to the wiresheet and connect them, based on one's need, to develop application logic. The logic that one creates may then be stored in a Spyder library for reuse. Upon being satisfied with the logic one has created, one may download the same to the controller. The logic thus created may be tested for correctness using the simulation and online debugging modes.

One may note that changing NCI (network configuration input) values, configuration of a schedule block, or daylight savings option, puts the application in a quick download pending state. As long as the application has been downloaded at least once to the controller, these changes just trigger a quick download to the controller.

One may use the control program option to program the Spyder tool. To do this, one may expand Lon Spyder or BACnet Spyder in the Nav palette and double-click control program to display the wiresheet view; display the palette (from the menu bar, select Window>Sidebars>Palette to display the palette).

The palette may appear on the left pane with the following items. Lon Spyder is a device that one may drag on to the Lon Network™ in the Nav palette to create a new device. Note that one cannot drop this on to the wiresheet of any macro or control program or application. BACnet Spyder is a device that one may drag on to the BACnet Network in the Nav palette to create a new device. It may be noted that one cannot drop this on to the wiresheet of any macro or control program or application. Physical points may be modulating and binary inputs or outputs. Software points may be used to create a network input, network setpoints, or a network output.

Additional items may include analog function blocks, logic function blocks, math function blocks, control function blocks, data-function function blocks, zone arbitration function blocks, and built-in function blocks.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic One may drag any of these noted items on to the wiresheet of a control program in its engineering mode and make the connections between physical points, software points, and function blocks to create a control program or an application.

A wiresheet view may be used to drag the physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette, right-click the device and select Actions>Download (the download dialog box may appear); and 2) select True under full download for a full download or false for a quick download. One may note that a quick download just downloads the modified items from a previous download where as with a full download the entire configuration may be downloaded to the controller replacing the existing configuration. However, if changes have been made to the SBus (Sylk or sensor bus) wall module by an operator/tenant locally from the display on the wall module, and a full download is performed, the Spyder tool may download the entire configuration to the controller except the SBus wall module configuration. This may be done to avoid losing any changes made locally on the SBus wall module during a download operation. Then at 3), one may click OK. The application logic may be downloaded to the controller based on one's selection.

In a recap example, a priority selection system may have control logic with two or more logic function blocks, one or more input points connected to one or more of the two or more logic function blocks, and an output point. The system may also have a priority override function block with two or more inputs for receiving outputs from the two or more logic function blocks of the control logic, and an output connected to an input of the output point of the control logic. The priority override function block may select an output from among the two or more outputs of the two or more logic function blocks as the output of the priority override function block. The control logic may be mapped to a first protocol. The priority override function block may be abstracted as a generic function block which is automatically compiled by control logic to be translated into additional logic having the same protocol as the control logic. The additional logic may achieve the same function as the priority override function block.

The two or more inputs of the priority override function block may effectively assign different priority levels to the outputs connected to the inputs. The priority override function block may provide an output which is one of the outputs from the two or more function blocks having a highest priority. A developer of the control logic circuit need not know the details of the priority override function block since the priority override function block may be compiled to an equivalent logic circuit based on a protocol.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A non-transitory computer-readable medium containing instructions which, when executed by a computer, provides a priority selection mechanism for commanding output objects, the priority selection mechanism comprising:
   - a priority array represented by a generic abstract function block, wherein the generic abstract function block comprises an abstract representation of priority driving logic for the priority array that maps to a BACnet protocol controller having a BACnet protocol and a LonTalk protocol controller having a LonTalk protocol; and
   - a compiler for automatically compiling the generic abstract function block to a mechanism of both the BACnet protocol and the LonTalk protocol;
   - wherein for the BACnet protocol controller, the priority array translates to a BACnet priority array input and for the LonTalk protocol controller, the priority array translates into logic that runs in a direct digital control engine having override blocks representative of a priority array input.

2. The non-transitory computer-readable medium of claim 1, wherein the abstract representation of the priority driving logic is a function block.

3. The non-transitory computer-readable medium of claim 2, wherein the function block is named "priority override."

4. The non-transitory computer-readable medium of claim 3, wherein the priority override function block is automatically translated into one or more override blocks, for the LonTalk protocol controller, by compile logic.

5. The non-transitory computer-readable medium of claim 4, wherein the compile logic automatically sets links between the one or more override blocks to accomplish control logic of the priority override function block.

6. A non-transitory computer-readable medium containing instructions which, when executed by a computer, provides a priority selection system comprising:
   - a control logic comprising:
     - two or more logic function blocks;
     - one or more input points connected to one or more of the two or more logic function blocks; and
     - an output point, wherein the control logic is mapped to a first protocol;
   - a priority override function block having two or more inputs for receiving outputs from the two or more logic function blocks of the control logic, and
     - having an output connected to an input of the output point of the control logic; and
   - wherein the priority override function block selects an output from among the two or more outputs of the two or more logic function blocks as the output of the priority override function block;
   - wherein the priority override function block is abstracted as a generic function block which is automatically compiled by control logic to be translated into additional logic having the same protocol as the control logic, the additional logic achieves the same function as the priority override function block;
   - wherein for a BACnet protocol controller, the priority override block is mapped to analog/binary object priority arrays;
   - wherein for a LonTalk protocol controller, the priority override block translates into logic that runs in a direct digital control engine having override blocks representative of a priority array input.

7. The non-transitory computer-readable medium of claim 6, wherein the two or more inputs of the priority override function block effectively assigns different priority levels to the outputs connected to the inputs.

8. The non-transitory computer-readable medium of claim 7, wherein the priority override function block provides an output which is one of the outputs from the two or more function blocks having a highest priority.

9. The non-transitory computer-readable medium of claim 6, wherein a developer of the control logic circuit need not know the details of the priority override function block since the priority override function block is compiled to an equivalent logic circuit based on a protocol.

* * * * *